(12) United States Patent
Jintaseranee et al.

(10) Patent No.: US 8,880,070 B1
(45) Date of Patent: Nov. 4, 2014

(54) TIME INTEGRATION OF ACTIVE-MODE EVENTS AND IDLE-MODE EVENTS INTO COMMUNICATION DATA RECORDS

(71) Applicant: Sprint Communications Company L.P., Overland Park, KS (US)

(72) Inventors: Kosol Jintaseranee, Millbrae, CA (US); Heesook Choi, Castro Valley, CA (US); Krishna Janakiraman, Mountain View, CA (US); Mark Evans, San Mateo, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 30 days.

(21) Appl. No.: 13/671,107

(22) Filed: Nov. 7, 2012

(51) Int. Cl.
*G06F 15/16* (2006.01)

(52) U.S. Cl.
USPC .......................................... 455/435.1; 455/433

(58) Field of Classification Search
USPC ............................ 455/433, 435.1, 436, 456.1
See application file for complete search history.

(56) References Cited

U.S. PATENT DOCUMENTS 7,305,442 B1    12/2007  Lundy
2011/0173360 A1*  7/2011  Thomson et al. ............. 710/260

OTHER PUBLICATIONS

Pierdomenico Fiadino, et al.; "Steps Towards the Extraction of Vechicular Mobility Patterns from 3G Signaling Data;" TMA; Mar. 12, 2012; pp. 1-22; FTW.

* cited by examiner

*Primary Examiner* — Sam Bhattacharya

(57) ABSTRACT

In a wireless communication system, a first wireless communication network exchanges data with wireless communication devices that are in active-mode on the first wireless communication network. The first network generates active-mode event records characterizing the data exchanges. A second wireless communication network receives registration messages from the wireless communication devices that are in idle-mode on the second wireless communication network. The second network generates corresponding idle-mode event records characterizing the idle-mode registrations. A data processing system integrates the active-mode event records and the idle-mode event records into integrated communication data records that correlate the active-mode events and the idle-mode events by their corresponding event times.

20 Claims, 5 Drawing Sheets

TIME INTEGRATION OF ACTIVE-MODE EVENTS AND IDLE-MODE EVENTS INTO COMMUNICATION DATA RECORDS

TECHNICAL BACKGROUND

In a wireless communication system, a wireless communication device is in active-mode when it has a traffic channel. This active-mode device typically transmits and/or receives data over its traffic channel. The user's communication device is in idle-mode when it has no traffic channel. When in idle-mode, the user's communication device continues to listen to the network for incoming call alerts and the like. When in idle-mode, the user's communication device also periodically transfers idle-mode registration messages to network systems.

The wireless communication system generates call detail records that characterize a user's communication activities such as voice calls, text messages, web sessions, and the like. For example, a call detail record might indicate the caller number, called number, call origination time, call termination time, invoked network elements, and bandwidth usage.

The wireless communication system may be comprised of multiple wireless networks that are each available to the user communication devices. Examples of these overlaid wireless networks include Long Term Evolution (LTE), Evolution Data Only (EVDO), Single-carrier Radio Transmission Technology (1xRTT). Each of these wireless networks has active-mode and idle-mode devices. Unfortunately, the call detail records from a first network are not being effectively or efficiently integrated with the idle-mode registrations of another network on a per-time basis.

TECHNICAL OVERVIEW

In a wireless communication system, a first wireless communication network exchanges data with wireless communication devices that are in active-mode on the first wireless communication network. The first network generates active-mode event records characterizing the data exchanges. A second wireless communication network receives registration messages from the wireless communication devices that are in idle-mode on the second wireless communication network. The second network generates corresponding idle-mode event records characterizing the idle-mode registrations. A data processing system integrates the active-mode event records and the idle-mode event records into integrated communication data records that correlate the active-mode events and the idle-mode events by their corresponding event times.

DETAILED DESCRIPTION

Figure 1:
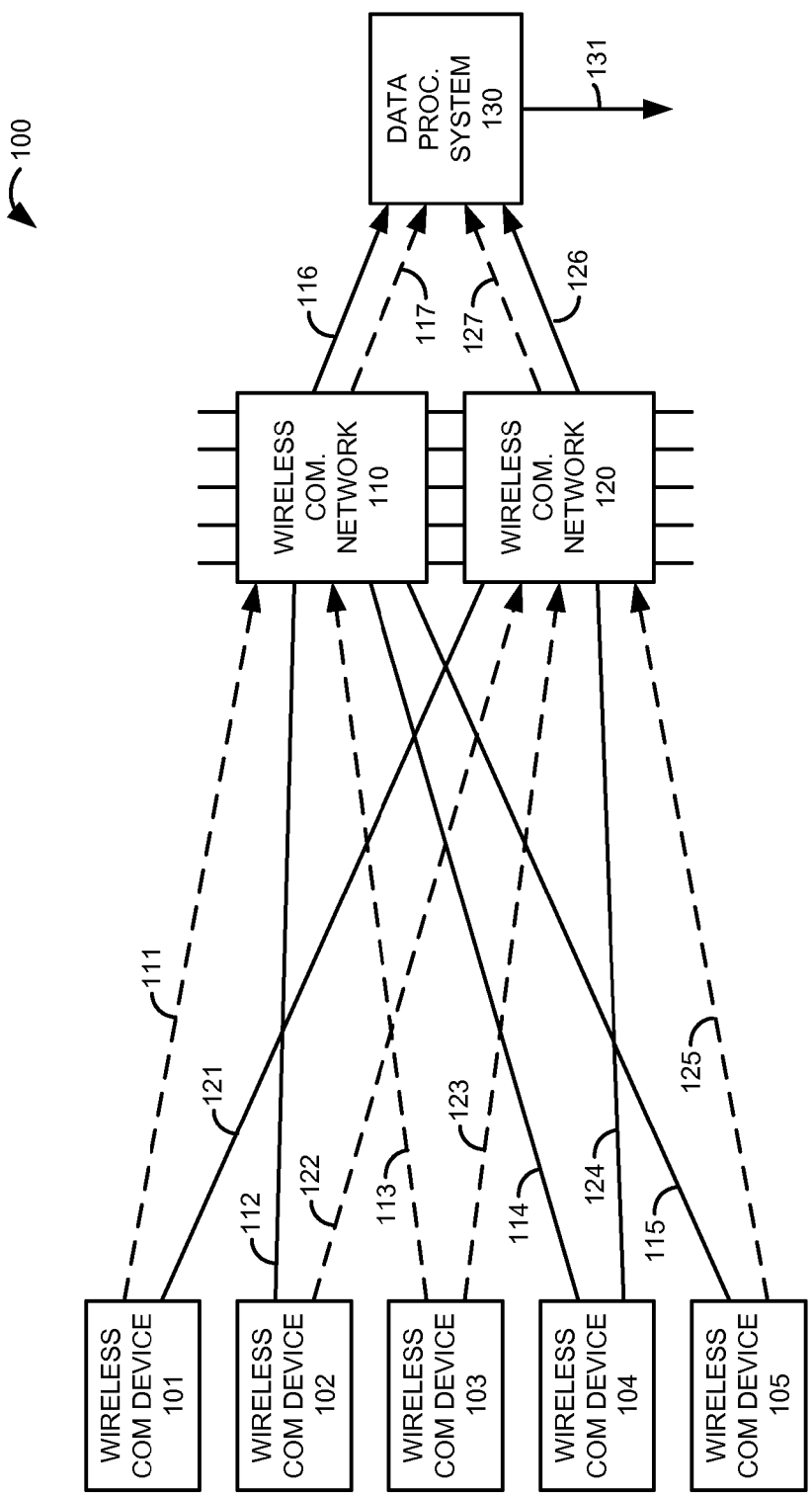
FIG. 1 illustrates a communication system to generate integrated communication data records that correlate active-mode event records and idle-mode event records by their corresponding event times.

FIG. 1 illustrates communication system 100 to generate integrated communication data records 131 that correlate active-mode events and idle-mode events by their corresponding event times. Communication system 100 comprises: wireless communication devices 101-105, wireless communication network 110, wireless communication network 120, and data processing system 130. Note that wireless communication network 110 and wireless communication network 120 represent different network types. For example, wireless communication network 110 might comprise a 1xRTT system and wireless communication network 120 might comprise an LTE and/or an EVDO system.

FIG. 1 represents a view over a short time-period in a dynamically changing environment where numerous wireless communication devices independently transition between active-mode and idle-mode on different wireless communication networks. At present, wireless communication network 110 exchanges data with active-mode devices 102, 104, and 105 over respective active-mode links 112, 114, and 115. Wireless communication network 110 receives idle-mode registration messages 111 and 113 from idle-mode devices 101 and 103. Likewise, wireless communication network 120 exchanges data with active-mode devices 101 and 104 over respective active-mode links 121 and 124. Wireless communication network 120 receives idle-mode registration messages 122-123 and 125 from idle-mode devices 102-103 and 105.

The wireless data exchanges occurring over the active-mode links comprise various events, such as connection request and time-out, text message transfer and delivery, voice call answer and release, and the like. These active-mode events occur at times that are recorded along with other pertinent information related to the user devices, network elements, and network usage that were invoked for the given data exchanges. Responsive to these active-mode events, wireless communication networks 110 and 120 respectively generate active-mode event records 116 and 126 that characterize the wireless data exchanges.

The idle-mode registration messages comprise status events occurring at times that are recorded along with other pertinent information related to the user devices, network elements, and network usage that were invoked for the given idle-mode registration. Responsive to these idle-mode events, wireless communication networks 110 and 120 generate idle mode event records 117 and 127 to characterize the idle-mode registrations. Over time, the active/idle mode status of wireless communication devices 101-105 depicted on FIG. 1 changes, and these changes are reflected in active-mode event records 116 and 126 and idle-mode event records 117 and 127.

Data processing system 130 processes active-mode event records 116 and 126 and idle-mode event records 117 and 127 to integrate active-mode event data and idle-mode event data into integrated communication data records 131. Integrated communication data records 131 correlate the active-mode events and the idle-mode events by their corresponding event times. Thus, system 130 might correlate idle mode registrations 113 and 123 from wireless communication device 103 because they occur within the same timeframe on proximate base stations. System 130 might correlate idle mode registration 122 with a call release event for wireless communication device 102 (terminating active session 112) because the idle-mode registration occurs shortly after the call release on proximately located base stations.

Data processing system 130 applies various rules to correlate and integrate the event records. For example, a wireless communication device that repeatedly transfers idle-mode registrations to one or more networks without any active mode activity is probably in continuous idle mode. A wireless communication device with numerous active-mode events and without any idle-mode registrations across multiple networks is probably in continuous active-mode. Consider the situation where a wireless communication device has an active-mode time-period on a first base station, and the active-mode period is time-bracketed by idle mode events for the same device on a second proximate (co-located) base station. This situation indicates that the wireless communication device was in idle mode on the first base station before and after the active-mode session—even if idle-mode records from the first network are not available. Thus, data processing system 130 can process the event records to develop probable active/idle mode timelines for individual wireless communication devices 101-105 on each of networks 110 and 120.

For a given wireless communication device, the active-mode events from a first network may be time-correlated to the idle-mode events from one or more other networks to determine the probable active/idle mode timeline for that device on the first network. This technique can be advantageous when idle-mode event records from the first network are not available. For example, the active-mode call events from a 1xRTT network may be time-correlated to the idle-mode events from an EVDO and/or LTE network to determine the probable active/idle mode timeline for that device on the 1xRTT network.

In EVDO examples, network 120 may scan EVDO traffic channels to detect and recover the idle-mode registrations. This may entail identifying idle-mode registrations from the traffic channels based on connection time and period. A short connection time (less than one second) indicates an idle-mode registration message. A repeating period (20 minutes, 30 minutes, etc.) also indicates an idle-mode registration message.

Integrated communication data records 131 may indicate the number of active-mode devices and the number of idle-mode devices on each of wireless communication networks 110 and 120 on a per-time basis. By correlating the active/idle mode timelines of multiple devices, the number of active mode devices and the number of idle mode devices is determined for each network on a time basis. These active/idle mode metrics that indicate the number of active mode devices and the number of idle mode devices per network per time may be further correlated to network regions, cells, and sectors. In addition to time correlation, data processing system 130 may also correlate the idle-mode and active-mode events to their associated wireless communication devices, wireless access systems, wireless access sectors, network elements, and the like.

Wireless communication devices 101-105 comprise phones, computers, media players, machine transceivers, and/or some other apparatus having wireless networking components. Wireless communication networks 110 and 120 comprise computer and communication systems, such as base stations, access points, gateways, servers, signaling processors, backhaul systems, and the like. Data processing system 130 comprises a computer and communication system.

Figure 2:
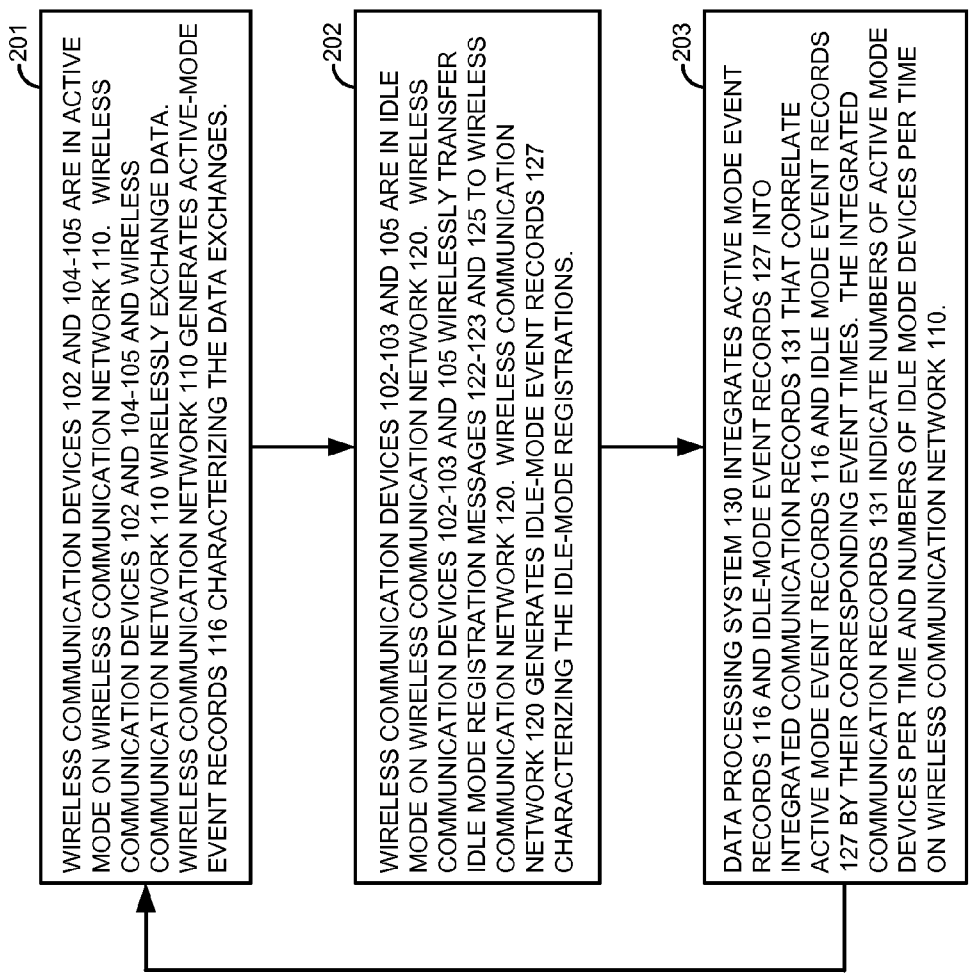
FIG. 2 illustrates an exemplary operation of the communication system to generate integrated communication data records that correlate active-mode event records and idle-mode event records by their corresponding event times.

FIG. 2 illustrates an exemplary operation of communication system 100 to generate integrated communication data records 131 that correlate active-mode event records and idle-mode event records by their corresponding event times. Initially, wireless communication devices 102 and 104-105 are in active mode on wireless communication network 110, and thus, wireless communication network 110 and wireless communication devices 102 and 104-105 wirelessly exchange data (201) over active-mode links 112 and 114-115. As a result, wireless communication network 110 generates active-mode event records 116 characterizing the wireless data exchanges (201).

Contemporaneously, wireless communication devices 102-103 and 105 are in idle-mode on wireless communication network 120, and thus, wireless communication network 120 receives idle-mode registration messages 122-123 and 125 from wireless communication devices 102-103 and 105 (202). As a result, wireless communication network 120 generates idle-mode event records 127 characterizing the idle-mode registrations (202).

Data processing system 130 processes active-mode event records 116 and idle-mode event records 127 to integrate active-mode event data and idle-mode event data into integrated communication data records 131 (203). Integrated communication data records 131 correlate the active-mode events from network 110 and the idle-mode events from network 120 by their corresponding event times. Thus, data processing system 130 might correlate idle mode registration 125 with active mode link 115 to determine an active/idle mode timeline for wireless communication device 105 on wireless communication network 110.

Figure 3:
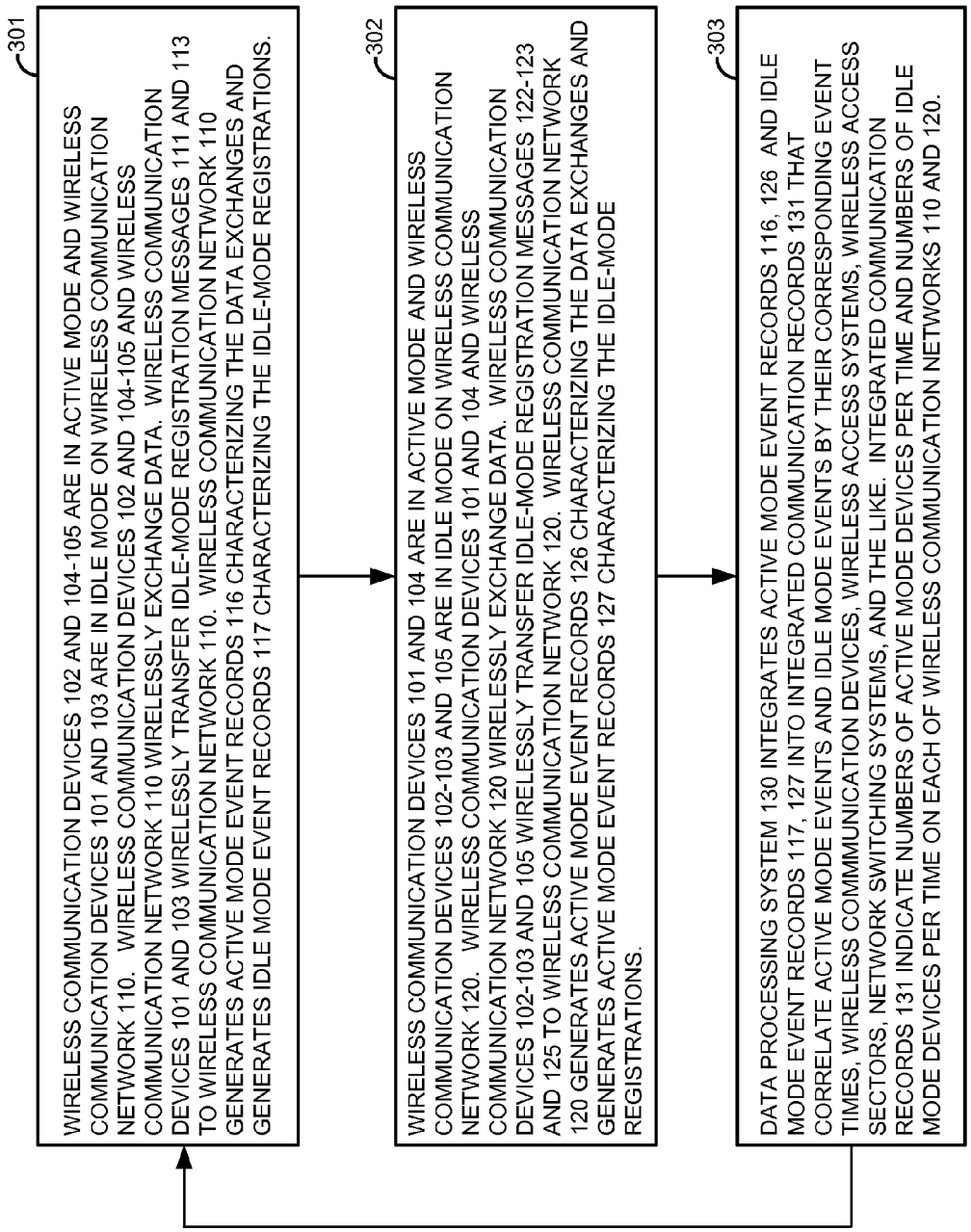
FIG. 3 illustrates another exemplary operation of the communication system to generate integrated communication data records 131 that correlate active-mode events and idle-mode events by time and other factors.

FIG. 3 illustrates another exemplary operation of communication system 100 to generate integrated communication data records 131 that correlate active-mode events and idle-mode events by times and other factors. Initially on wireless communication network 110, wireless communication devices 102 and 104-105 are in active mode, and wireless communication devices 101 and 103 are in idle-mode (301). Wireless communication network 110 and wireless communication devices 102 and 104-105 wirelessly exchange data over active-mode links 112 and 114-115, and wireless communication network 110 generates active-mode event records 116 characterizing the wireless data exchanges (301). Wireless communication devices 101 and 103 transfer idle-mode registration messages 111 and 113 to wireless communication network 110, and wireless communication network 110 generates idle-mode event records 117 characterizing the idle-mode registrations (301).

Contemporaneously on wireless communication network 120, wireless communication devices 101 and 104 are in active mode, and wireless communication devices 102-103 and 105 are in idle-mode (302). Wireless communication network 120 and wireless communication devices 101 and 104 wirelessly exchange data over active-mode links 121 and 124, and wireless communication network 120 generates active-mode event records 126 characterizing the wireless data exchanges (302). Wireless communication devices 102-103 and 105 transfer idle-mode registration messages 122-123 and 125 to wireless communication network 120, and wireless communication network 120 generates idle-mode event records 127 characterizing the idle-mode registrations (302).

Data processing system 130 processes active-mode event records 116 and 126 and the idle-mode event records 117 and 127 to integrate active-mode event data and idle-mode event data into integrated communication data records 131 (303). Integrated communication data records 131 correlate the active and idle mode events from network 110 with the active and idle mode events from network 120 by their corresponding event times. Thus, data processing system 130 might correlate idle mode registration 125 with active mode link 115 to determine an active/idle mode timeline for wireless communication device 105 on wireless communication networks 110 and 120.

Integrated communication data records 131 indicate the number of active-mode devices and the number of idle-mode devices on each of wireless communication networks 110 and 120 on a per-time basis (303). The numbers of active and idle mode devices per network per time may be further correlated to network regions, cells, and sectors. In addition to time correlation, data processing system 130 correlates the idle-mode and active-mode event records to their associated wireless communication devices, wireless access systems, wireless access sectors, network elements, and the like (303).

Figure 4:
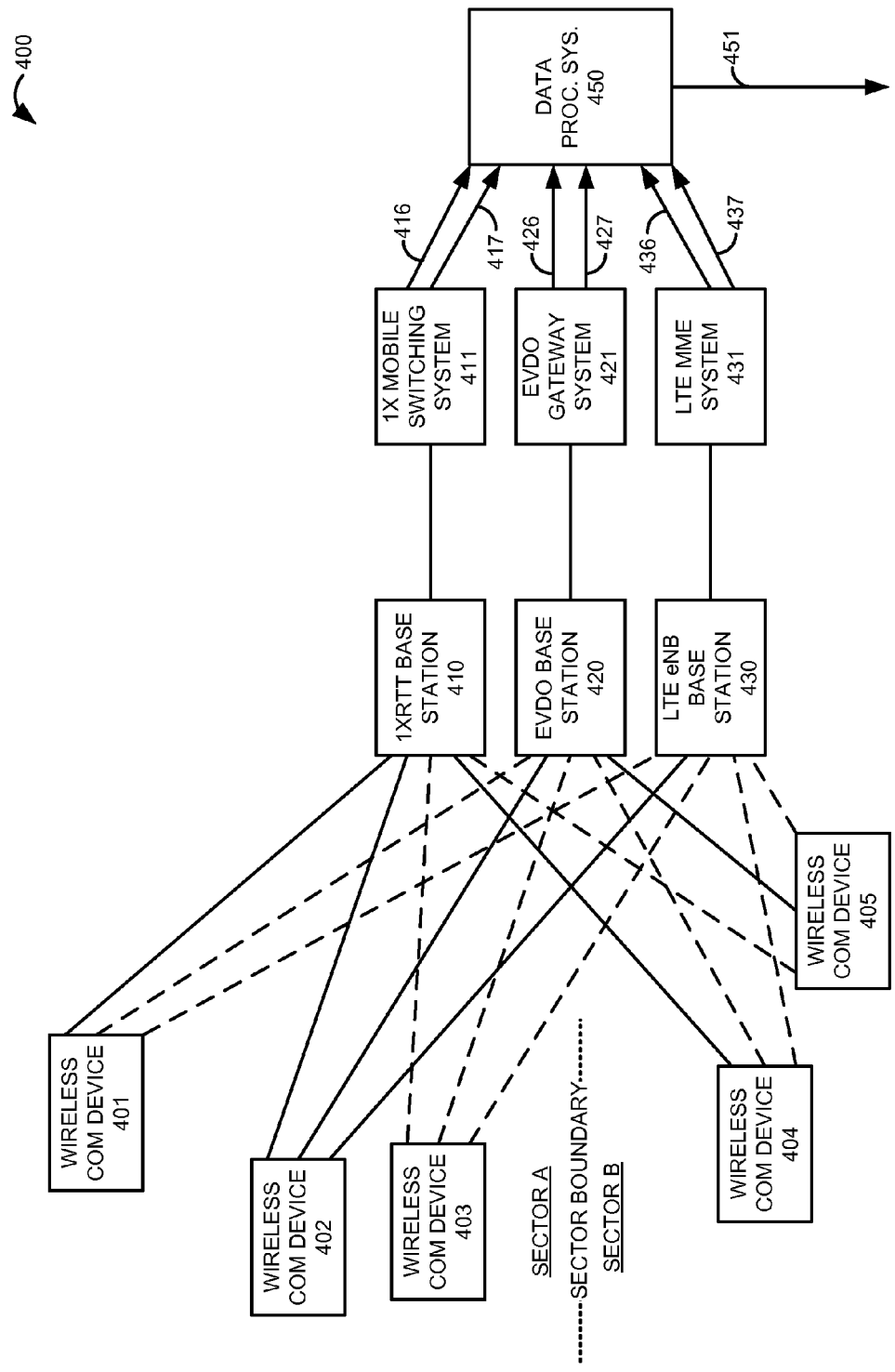
FIG. 4 illustrates a communication system to generate integrated communication data records that correlate active-mode event records and idle-mode event records by time and other factors.

FIG. 4 illustrates communication system 400 to generate integrated communication data records 451 that correlate active-mode event records and idle-mode event records by time and other factors. Communication system 400 comprises: wireless communication devices 401-405, 1× base station 410, EVDO base station 420, LTE eNodeB base station 430, 1× mobile switching system 411, EVDO gateway system 421, LTE Mobile Management Entity (MME) system 431, and data processing system 450. Note that FIG. 4 represents a snap-shot of a dynamically changing situation where numerous wireless communication devices independently transition between active-mode (solid line) and idle-mode (dashed line) on different wireless communication networks (1xRTT, EVDO, and LTE). Also note that base stations 410, 420, and 430 are proximate to one another (perhaps co-located on the same structure), so if a wireless communication device is idle on base station 410, then the device is probably also idle on base stations 420 and 430, unless active-mode records for that time and correlated to base stations 420 and 430 show otherwise.

Wireless communication devices 401-405 exchange wireless data with base stations 410, 420, and 430. Active-mode records 416, 426, and 436 that characterize these data exchanges are generated by systems 411, 421, and 431 and transferred to data processing system 450. When idle, wireless communication devices 401-405 transfer idle-mode registration messages to systems 411, 421, and 431 over respective base stations 410, 420, and 430. Idle-mode records 417, 427, and 437 that characterize these idle-mode registrations are generated by systems 411, 421, and 431 and transferred to data processing system 450. Idle-mode registration data may not be available from 1× mobile switching system 411 in some examples.

Data processing system 450 processes active-mode records 416, 426, and 436 and idle-mode records 417, 427, and 437 to integrate active-mode events and idle-mode events into integrated communication data records 451. Integrated communication data records 451 correlate the active-mode events and the idle-mode events by their corresponding event times. The active-mode records and the idle mode records may indicate their respective sectors, base stations, management systems, networks, and the like. For example, an idle mode registration from wireless communication device 403 to LTE MME 431 might indicate time-of-day, device 403, sector A, eNodeB 430, MME 431, and the LTE network. A data session request from wireless communication device 405 to EVDO gateway system 421 might indicate time-of-day, device 405, sector B, base station 420, gateway 421, and the EVDO network. Active mode records 416, 426, and 436 and idle-mode records 417, 427, and 437 indicate this information.

Data processing system 450 processes this type of data to correlate the various sectors, base stations, networks, and the like to the active/idle mode status and time for individual wireless communication devices. Integrated communication data records 451 may indicate the number of active-mode devices and the number of idle-mode devices on each of the three wireless communication networks on a per-time basis. For example, data processing system 450 may determine the number of active-mode devices and the number if idle-mode devices in Sector A for each of the three networks—1xRTT, EVDO, and LTE. This processing can be repeated to provide system-wide idle/active device number tracking at the sector level across multiple networks.

Figure 5:
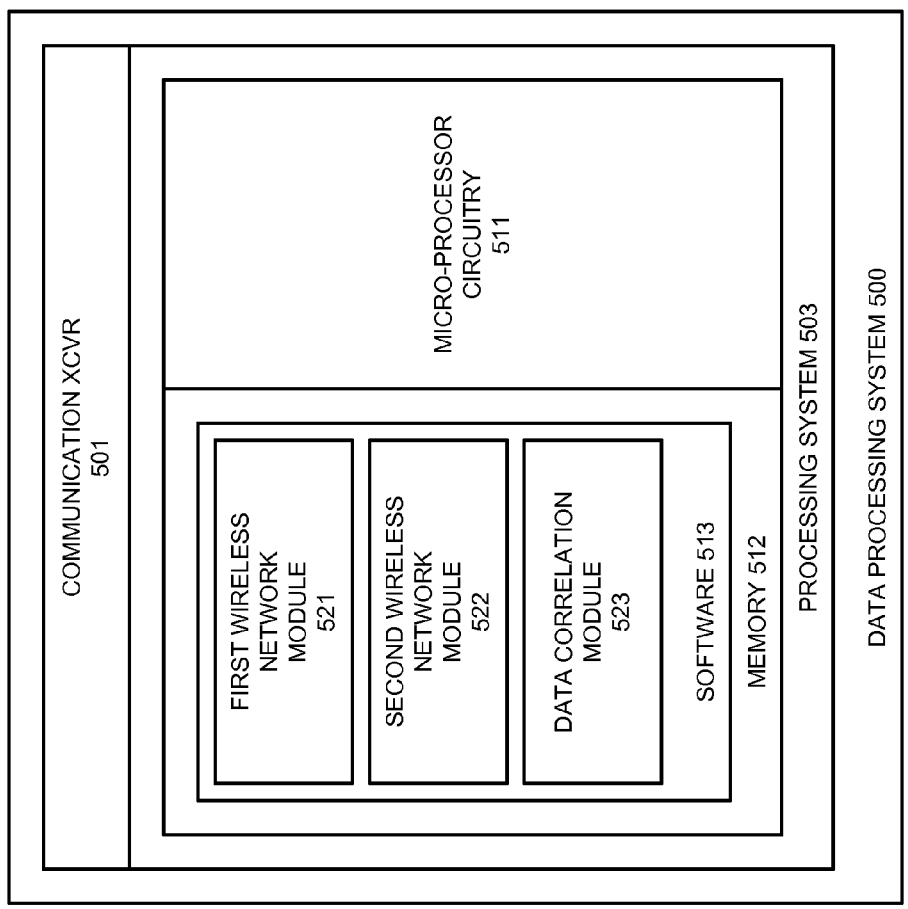
FIG. 5 illustrates a data processing system to correlate active-mode events and idle-mode events by their corresponding event times.

FIG. 5 illustrates data processing system 500 to correlate active-mode events and idle-mode events by their corresponding event times. Data processing system 500 is an example of the data processing systems 130 and 450 described herein, although these systems may use alternative configurations. Data processing system 500 comprises communication transceiver 501 and processing system 503. Processing system 503 comprises micro-processing circuitry 511 and memory 512. Memory 512 stores software 513. Data processing system 500 may be integrated into a single platform or may be distributed across multiple diverse computer and communication systems. Some conventional aspects of data processing system 500 are omitted for clarity, such as power supplies, enclosures, and the like.

Communication transceiver 501 comprises communication components, such as ports, circuitry, memory, software, and the like. Communication transceiver 501 typically utilizes Ethernet, Internet, or some other networking protocol suitable for network information systems—including combinations thereof.

Micro-processor circuitry 511 comprises circuit boards that hold integrated circuitry and associated electronics. Memory 512 comprises non-transitory, computer-readable, data storage media, such as flash drives, disc drives, and the like. Software 513 comprises computer-readable instructions that control the operation of micro-processor circuitry 511 when executed. Software 513 includes modules 521-523 and may also include operating systems, applications, utilities, databases, and the like. Micro-processor circuitry 511 and memory 512 may be integrated into a single computer system or may be distributed across multiple computer systems. All or portions of software 513 may be externally stored on flash drives, discs, servers, and the like.

When executed by circuitry 511, first wireless network module 521 directs circuitry 511 to receive active-mode event records and/or idle-mode event records from the first network. When executed by circuitry 511, second wireless network module 522 directs circuitry 511 to receive active-mode event records and/or idle-mode event records from the second network. When executed by circuitry 511, data correlation module 523 directs circuitry 511 to integrate the active-mode event records and the idle-mode event records by time and possibly other factors as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system that serves a plurality of wireless communication devices, the method comprising:
   in a first wireless communication network, exchanging data with ones of the wireless communication devices that are in active-mode on the first wireless communication network and generating corresponding active-mode event records characterizing the data exchanges;
   in a second wireless communication network, receiving registration messages transferred by ones of the wireless communication devices that are in idle-mode on the second wireless communication network and generating corresponding idle-mode event records characterizing the idle-mode registrations; and
   in a data processing system, integrating the active-mode event records and the idle-mode event records into integrated communication data records that correlate the active-mode event records and the idle-mode event records by their corresponding event times.

2. The method of claim 1 wherein the integrated communication data records indicate numbers of the wireless communication devices in idle-mode per time on the first wireless communication network and numbers of the wireless communication devices in active-mode per time on the first wireless communication network.

3. The method of claim 1 wherein the integrated communication data records correlate the active-mode event records and the idle-mode event records to their corresponding wireless communication devices.

4. The method of claim 1 wherein the integrated communication data records correlate the active-mode event records and the idle-mode event records to their corresponding wireless access systems.

5. The method of claim 1 wherein the integrated communication data records correlate the active-mode event records and the idle-mode event records to their corresponding wireless access sectors.

6. The method of claim 1 wherein the integrated communication data records correlate the active-mode event records and the idle-mode event records to their corresponding network switching systems.

7. The method of claim 1 wherein the integrated communication data records correlate active-mode data messaging event records with the idle-mode event records.

8. The method of claim 1 wherein the integrated communication data records correlate active-mode voice calling event records with the idle-mode event records.

9. The method of claim 1 wherein receiving the registration messages comprises monitoring user traffic channels in the second wireless communication network to detect the registration messages.

10. The method of claim 1 wherein the first wireless communication network comprises a 1xRTT network and the second wireless communication network comprises at least one of a Long Term Evolution network and an Evolution Data Only network.

11. A wireless communication system that serves a plurality of wireless communication devices comprising:
    a first wireless communication network configured to exchange data with ones of the wireless communication devices that are in active-mode on the first wireless communication network and to generate corresponding active-mode event records characterizing the data exchanges;
    a second wireless communication network configured to receive registration messages transferred by ones of the wireless communication devices that are in idle-mode on the second wireless communication network and to generate corresponding idle-mode event records characterizing the idle-mode registrations; and
    a data processing system configured to integrate the active-mode event records and the idle-mode event records into integrated communication data records that correlate the active-mode event records and the idle-mode event records by their corresponding event times.

12. The wireless communication system of claim 11 wherein the integrated communication data records indicate numbers of the wireless communication devices in idle-mode per time on the first wireless communication network and numbers of the wireless communication devices in active-mode per time on the first wireless communication network.

13. The wireless communication system of claim 11 wherein the integrated communication data records correlate the active-mode event records and the idle-mode event records to their corresponding wireless communication devices.

14. The wireless communication system of claim 11 wherein the integrated communication data records correlate the active-mode event records and the idle-mode event records to their corresponding wireless access systems.

15. The wireless communication system of claim 11 wherein the integrated communication data records correlate the active-mode event records and the idle-mode event records to their corresponding wireless access sectors.

16. The wireless communication system of claim 11 wherein the integrated communication data records correlate the active-mode event records and the idle-mode event records to their corresponding network switching systems.

17. The wireless communication system of claim 11 wherein the integrated communication data records integrate active-mode data messaging event records with the idle-mode event records.

18. The wireless communication system of claim 11 wherein the integrated communication data records integrate active-mode voice calling event records with the idle-mode event records.

19. The wireless communication system of claim 11 wherein the second wireless communication network is configured to receive the registration messages by monitoring user traffic channels to detect the registration messages.

20. The wireless communication system of claim 11 wherein the first wireless communication network comprises a 1xRTT network and the second wireless communication network comprises at least one of a Long Term Evolution network and an Evolution Data Only network.

* * * * *